United States Patent
Zhang et al.

(10) Patent No.: US 12,530,809 B2
(45) Date of Patent: Jan. 20, 2026

(54) METHODS AND APPARATUSES FOR DYNAMIC MESH COMPRESSION

(71) Applicant: Tencent America LLC, Palo Alto, CA (US)

(72) Inventors: Xiang Zhang, Sunnyvale, CA (US); Chao Huang, Palo Alto, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 406 days.

(21) Appl. No.: 17/862,066

(22) Filed: Jul. 11, 2022

(65) Prior Publication Data

US 2023/0014820 A1    Jan. 19, 2023

Related U.S. Application Data

(60) Provisional application No. 63/223,431, filed on Jul. 19, 2021.

(51) Int. Cl.
*G06T 9/00* (2006.01)
*G06T 15/04* (2011.01)
*G06T 17/20* (2006.01)

(52) U.S. Cl.
CPC ............. *G06T 9/001* (2013.01); *G06T 15/04* (2013.01); *G06T 17/20* (2013.01)

(58) Field of Classification Search
CPC ......... G06T 9/001; G06T 15/04; G06T 17/20; G06T 9/004; H04N 19/503
See application file for complete search history.

(56) References Cited

U.S. PATENT DOCUMENTS

| | | | |
|---|---|---|---|
| 6,614,428 B1 | 9/2003 | Lengyel | |
| 8,502,815 B2 * | 8/2013 | Stefanoski | G06T 9/001 345/428 |
| 2016/0086353 A1 | 3/2016 | Lukac | |
| 2018/0189982 A1 | 7/2018 | Laroche et al. | |

(Continued)

FOREIGN PATENT DOCUMENTS

| | | | | |
|---|---|---|---|---|
| CN | 110719497 A * | 1/2020 | | G06T 3/60 |
| CN | 116368526 A * | 6/2023 | | G06T 17/20 |

(Continued)

OTHER PUBLICATIONS

International Search Report and Written Opinion issued Oct. 4, 2022 in Application No. PCT/US2022/073670. (28 pages).

(Continued)

*Primary Examiner* — Chante E Harrison
(74) *Attorney, Agent, or Firm* — ArentFox Schiff LLP

(57) ABSTRACT

Aspects of the disclosure provide methods and apparatuses for mesh coding (e.g., compression and decompression). In some examples, an apparatus for mesh coding includes processing circuitry. The processing circuitry decodes, using a point cloud compression (PCC) decoder and from a bitstream, a point cloud that includes points corresponding to at least one of vertices in a mesh or sampling points of polygons in the mesh. The processing circuitry determines, based on the point cloud, estimated connectivity information of the vertices in the mesh, and generate, a reconstructed mesh frame based on the point cloud and the estimated connectivity information.

11 Claims, 14 Drawing Sheets

(56) References Cited

U.S. PATENT DOCUMENTS

| | | |
|---|---|---|
| 2018/0268570 A1 | 9/2018 | Budagavi et al. |
| 2020/0221139 A1 | 7/2020 | Vosoughi et al. |
| 2020/0304773 A1 | 9/2020 | Tomkevicius |
| 2021/0090301 A1* | 3/2021 | Mammou ............ G06T 7/11 |
| 2022/0164994 A1 | 5/2022 | Joshi et al. |

FOREIGN PATENT DOCUMENTS

| | | | |
|---|---|---|---|
| CN | 117121487 A * | 11/2023 | ........... H04N 19/105 |
| WO | 2021/116838 A1 | 6/2021 | |
| WO | 2021/136878 A1 | 7/2021 | |
| WO | WO-2025084224 A1 * | 4/2025 | ............... G06T 9/00 |

OTHER PUBLICATIONS

Vasa et al. "Coddyac: Connectivity driven dynamic mesh compression." 2007 3DTV Conference. IEEE, 2007. Retrieved on Aug. 29, 2022 (Aug. 29, 2022) from <https://ieeexplore.ieee.org/abstract/document/4379408> entire document.

Japanese Office Action issued Jan. 15, 2024 in Application No. 2023-525096. (11 pages).

Draft CfP for Dynamic Mesh Coding, International Organization for Standardizationorganisation Internationale De Normalisationiso/IEC JTC 1/SC 29/WG 7 MPEG 3D Graphics Coding, Document No. N 00122, Apr. 2021, Virtual, Jul. 9, 2021.

Extended European Search Report and Search Opinion received for European Application No. 22846748.6, mailed on Aug. 5, 2024, 10 pages.

Graziosi et al.,"[V-PCC] [EE2.6-related] Mesh Patch Data", 132. MPEG Meeting, Online, Motion Picture Expert Group or ISO/IEC JTC1/SC29/WG11), No. m55368-v1, Oct. 7, 2020, 14 pages.

Rhyu et al., "[V-PCC] [New Proposal] V-PCC extension for mesh coding", 126. MPEG Meeting, Geneva, Motion Picture Expert Group or ISO/IEC JTC1/SC29/WG11, No. m47608-v1, Mar. 20, 2019, 3 pages.

* cited by examiner

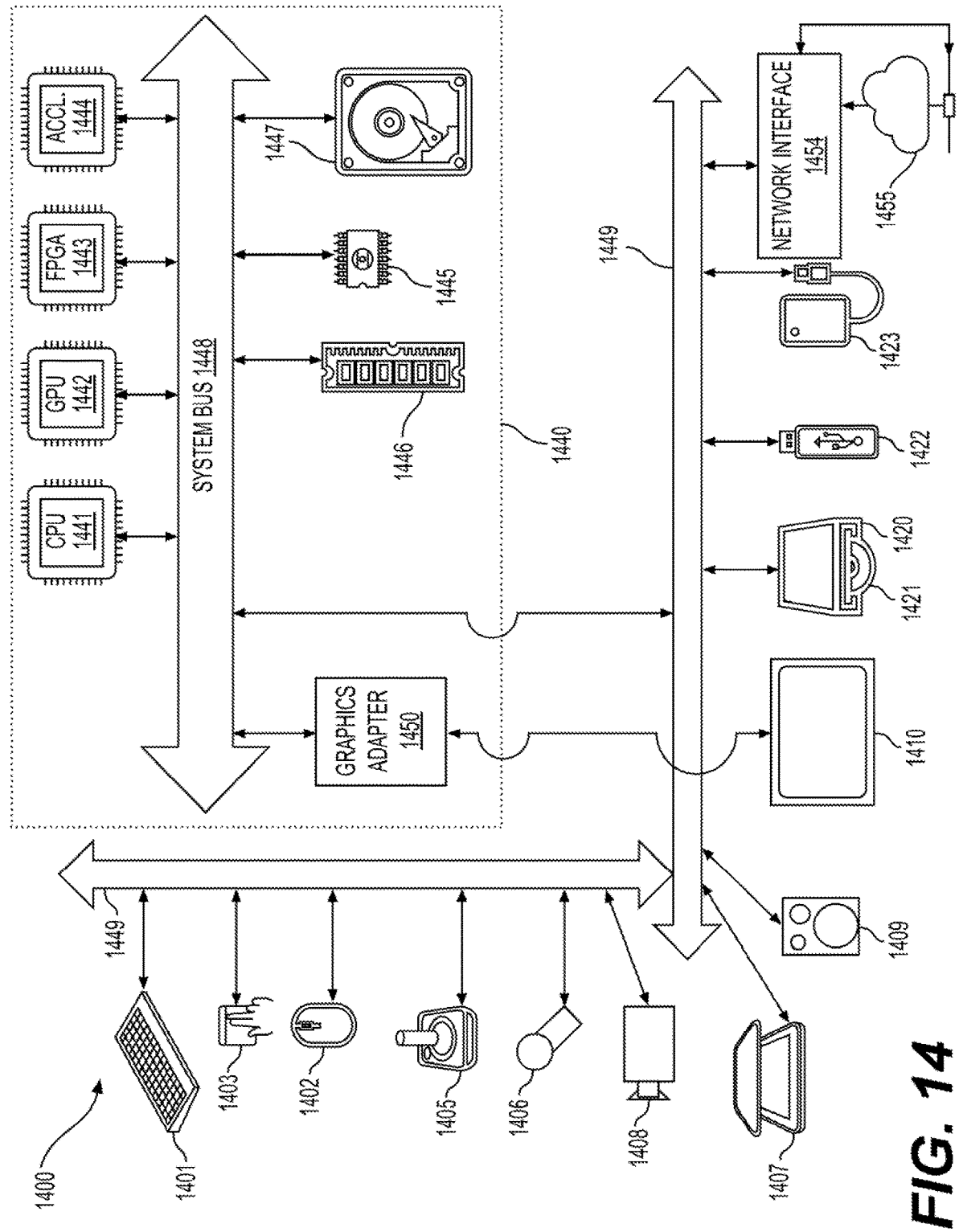

METHODS AND APPARATUSES FOR DYNAMIC MESH COMPRESSION

INCORPORATION BY REFERENCE

This present application claims the benefit of priority to U.S. Provisional Application No. 63/223,431, "Methods for Dynamic Mesh Compression" filed on Jul. 19, 2021, which is incorporated by reference herein in its entirety.

TECHNICAL FIELD

The present disclosure describes embodiments generally related to mesh coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. In some examples, point clouds and meshes can be used as 3D representations of the world.

SUMMARY

Aspects of the disclosure provide methods and apparatuses for mesh coding (e.g., compression and decompression). In some examples, an apparatus for mesh coding includes processing circuitry. The processing circuitry decodes, using a point cloud compression (PCC) decoder and from a bitstream, a point cloud that includes points corresponding to at least one of vertices in a mesh or sampling points of polygons in the mesh. The processing circuitry determines, based on the point cloud, estimated connectivity information of the vertices in the mesh, and generate, a reconstructed mesh frame based on the point cloud and the estimated connectivity information.

In some examples, the processing circuitry decodes, using a video decoder and from the bitstream, a two dimensional (2D) image corresponding to a texture map of attributes associated with a surface of the mesh, and generates, the reconstructed mesh frame based on the point cloud, the estimated connectivity information, and the 2D image for a texture map.

In some examples, the processing circuitry decodes, using an attribute decoder and from the bitstream, texture coordinates corresponding to mapping information of the mesh, and generates, the reconstructed mesh frame based on the point cloud, the estimated connectivity information, the 2D image of the texture map, and the texture coordinates for the mapping information.

In some examples, the processing circuitry decodes, from the bitstream, a connectivity difference, and combines, the estimated connectivity information with the connectivity difference to generate combined connectivity information. The processing circuitry generates, the reconstructed mesh frame based on the point cloud and the combined connectivity information.

In some examples, the points in the point cloud correspond to vertices of a voxelized mesh.

In some embodiments, the reconstructed mesh frame is a mesh frame in a dynamic mesh that includes a sequence of mesh frames. The processing circuitry predicts, using an interframe connectivity prediction, current connectivity information of a current mesh frame based on reference connectivity information of a reference mesh frame that has been reconstructed; and reconstructs the current mesh frame based on the current connectivity information that is predicted based on the reference connectivity information of the reference mesh frame.

In some embodiments, the processing circuitry decodes, from the bitstream, an interframe connectivity difference, and determines the current connectivity information based on a combination of the interframe connectivity difference and the reference connectivity information of the reference mesh frame.

In some embodiments, the processing circuitry decodes a flag in a syntax associated with a scope of the dynamic mesh. The flag indicates of using the interframe connectivity prediction in the scope of the dynamic mesh. The processing circuitry predicts, using the interframe connectivity prediction, the current connectivity information associated with a mesh portion in the scope of the dynamic mesh based on the reference connectivity information of the reference mesh frame.

In some example, the processing circuitry determines, for a current coding unit in the current mesh frame, a reference coding unit in the reference mesh frame based on at least one of an index or a motion vector, and determines, using the interframe connectivity prediction, the current connectivity information of the current coding unit in the current mesh frame based on the reference connectivity information of the reference coding unit in the reference mesh frame.

Aspects of the disclosure also provide a non-transitory computer-readable medium storing instructions which when executed by a computer cause the computer to perform any one or a combination of the methods for mesh coding.

BRIEF DESCRIPTION OF THE DRAWINGS

Further features, the nature, and various advantages of the disclosed subject matter will be more apparent from the following detailed description and the accompanying drawings in which:

FIG. 14 is a schematic illustration of a computer system in accordance with an embodiment.

DETAILED DESCRIPTION OF EMBODIMENTS

Figure 1:
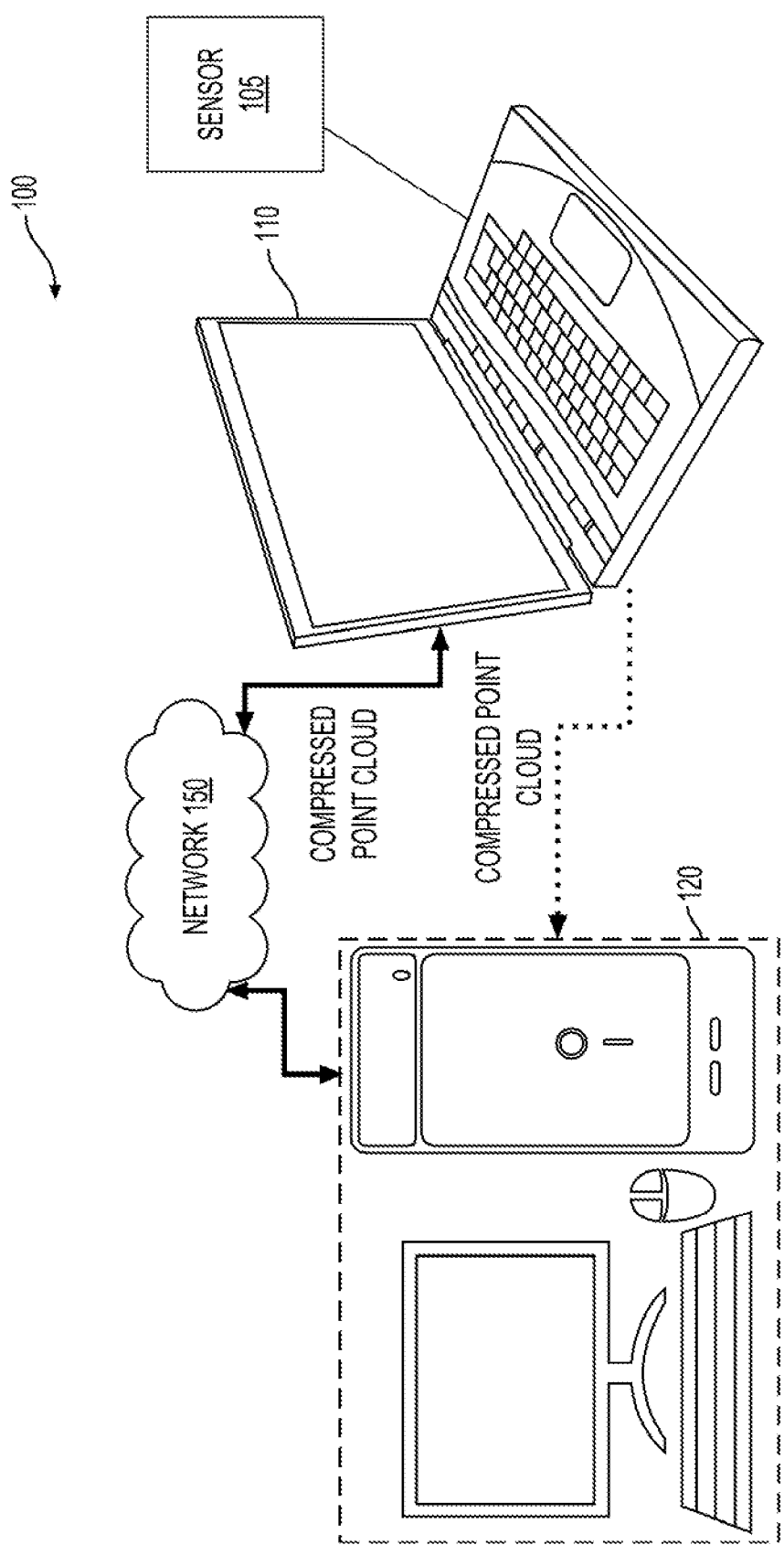
FIG. 1 is a schematic illustration of a simplified block diagram of a communication system in accordance with an embodiment.

Aspects of the disclosure provide techniques for mesh compression in the field of three dimensional (3D) media processing.

Technology developments in 3D media processing, such as advances in three dimensional (3D) capture, 3D modeling, and 3D rendering, and the like have promoted the ubiquitous presence of 3D contents across several platforms and devices. In an example, a baby's first step can be captured in one continent, media technology can allow grandparents to view (and may be interact) and enjoy an immersive experience with the baby in another continent. According to an aspect of the disclosure, in order to improve immersive experience, 3D models are becoming ever more sophisticated, and the creation and consumption of 3D models occupy a significant amount of data resources, such as data storage, data transmission resources.

According to some aspects of the disclosure, meshes can be used as a type of 3D models to represent immersive contents. A mesh (also referred to as mesh model) of an object can include polygons that describe the surface of the object. Each polygon can be defined by vertices of the polygon in 3D space and the information of how the vertices are connected into the polygon. The information of how the vertices are connected is referred to as connectivity information. In some examples, the mesh can also include attributes, such as color, normal, and the like, associated with the vertices. The attributes could also be associated with the surface of the mesh by exploiting mapping information that parameterizes the mesh with 2D attribute maps. The mapping information is usually described by a set of parametric coordinates, referred to as UV coordinates or texture coordinates, associated with the mesh vertices. 2D attribute maps (referred to as texture maps in some examples) are used to store high resolution attribute information such as texture, normals, displacements etc. Such information could be used for various purposes such as texture mapping and shading.

In some embodiments, a mesh can include components that are referred to as geometry information, connectivity information, mapping information, vertex attributes, and attribute maps. In some examples, the geometry information is described by a set of 3D positions associated with the vertices of the mesh. In an example, (x,y,z) coordinates can be used to describe the 3D positions of the vertices. In some examples, the connectivity information includes a set of vertex indices that describes how to connect the vertices to create a 3D surface. In some examples, the mapping information describes how to map the mesh surface to 2D regions of the plane. In an example, the mapping information (also referred to as UV mapping, texture mapping) is described by a set of UV parametric/texture coordinates (u,v) associated with the mesh vertices together with the connectivity information. In some examples, the vertex attributes include scalar or vector attribute values associated with the mesh vertices. In some examples, attribute maps include attributes that are associated with the mesh surface and are stored as 2D images/videos. In an example, the mapping between the videos (e.g., 2D images/videos) and the mesh surface is defined by the mapping information.

According to an aspect of the disclosure, a dynamic mesh is a mesh where at least one of the components (geometry information, connectivity information, mapping information, vertex attributes and attribute maps) varies with time. A dynamic mesh can be described by a sequence of meshes (also referred to as mesh frames). The dynamic mesh may require a large amount of data since the dynamic mesh may include a significant amount of information changing over time. Compression technologies of meshes can allow efficient storage and transmission of media contents in the mesh representation.

In some examples, a dynamic mesh can have constant connectivity information, time varying geometry and time varying vertex attributes. In some examples, a dynamic mesh can have time varying connectivity information. In an example, digital content creation tools usually generate dynamic meshes with time varying attribute maps and time varying connectivity information. In some examples, volumetric acquisition techniques are used to generate dynamic meshes. The volumetric acquisition techniques can generate a dynamic mesh with time varying connectivity information especially under real time constraints.

Aspects of the disclosure provide techniques for mesh compression. The techniques can be used for various mesh compression, static mesh compression, dynamic mesh compression, compression of a dynamic mesh with constant connectivity information, compression of a dynamic mesh with time varying connectivity information, compression of a dynamic mesh with time varying attribute maps, and the like. The techniques can be used in lossy and lossless compression for various applications, such as real-time communications, storage, free viewpoint video, augmented reality (AR), virtual reality (VR), and the like. The applications can include functionalities such as random access and scalable/progressive coding.

Some aspects of the disclosure provide frameworks that use point cloud compression (PCC) codecs (e.g., existing PCC encoders and PCC decoders) for mesh compression, such as dynamic mesh compression.

Point clouds are another type of 3D models to represent immersive contents. A point cloud generally may refer to a set of points in a 3D space, each with associated attributes, such as color, material properties, texture information, intensity attributes, reflectivity attributes, motion related attributes, modality attributes, and various other attributes. Point clouds can be used to reconstruct an object or a scene as a composition of such points. The points can be captured using multiple cameras, depth sensors or Lidar in various setups and may be made up of thousands up to billions of points in order to realistically represent reconstructed scenes or objects. A patch generally may refer to a contiguous subset of the surface described by the point cloud. In an example, a patch includes points with surface normal vectors that deviate from one another less than a threshold amount.

PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. A PCC codec (encoder/decoder) in the present disclosure can be G-PCC codec (encoder/decoder) or V-PCC codec.

According to an aspect of the disclosure, the main philosophy behind V-PCC is to leverage existing video codecs to compress the geometry, occupancy, and texture of a dynamic point cloud as three separate video sequences. The extra metadata needed to interpret the three video sequences are compressed separately. A small portion of the overall bitstream is the metadata, which could be encoded/decoded efficiently using software implementation. The bulk of the information is handled by the video codec.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
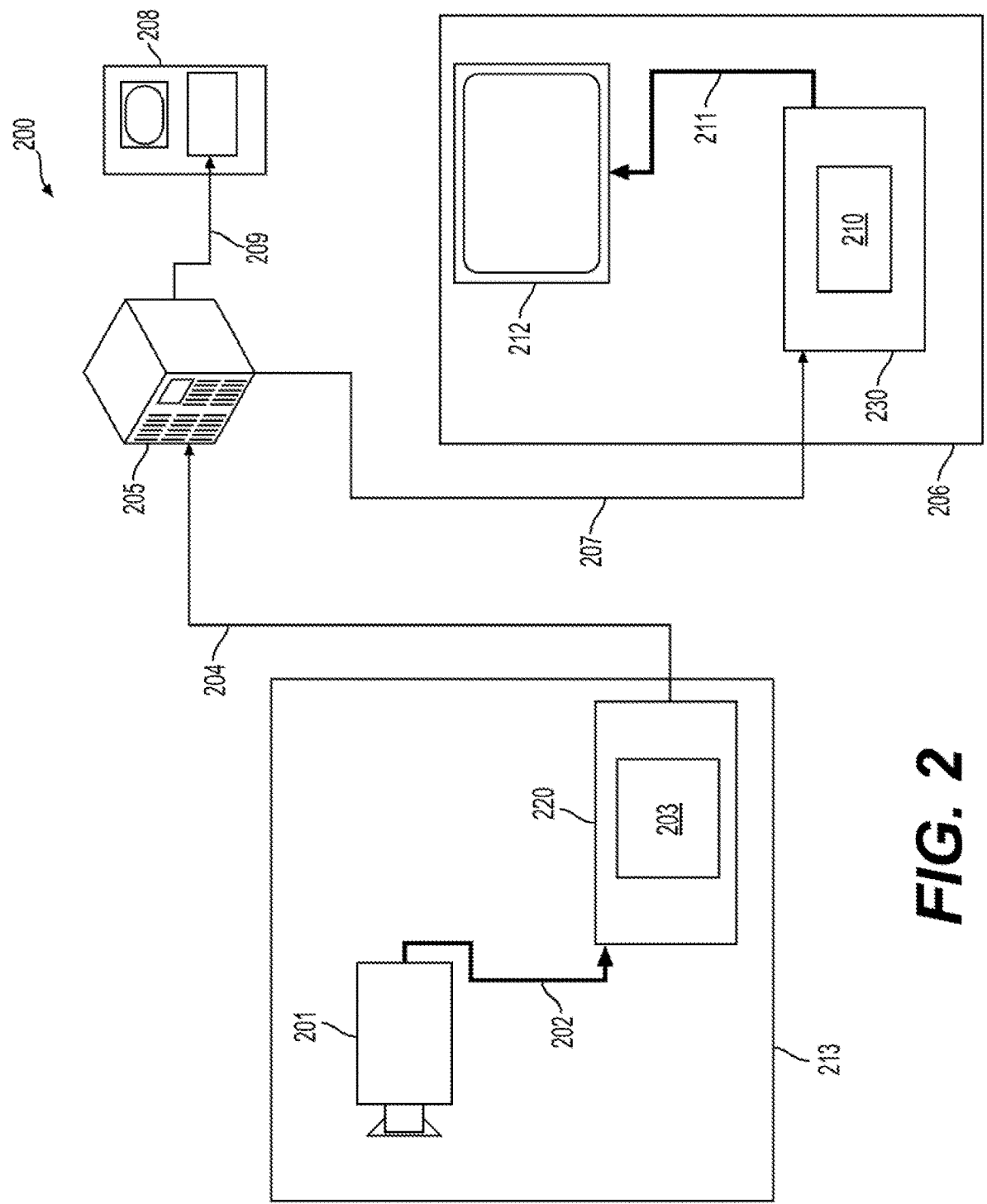
FIG. 2 is a schematic illustration of a simplified block diagram of a streaming system in accordance with an embodiment.

FIG. 2 illustrates a simplified block diagram of a streaming system (200) in accordance with an embodiment. The FIG. 2 example is an application for the disclosed subject matter for a point cloud. The disclosed subject matter can be equally applicable to other point cloud enabled applications, such as, 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
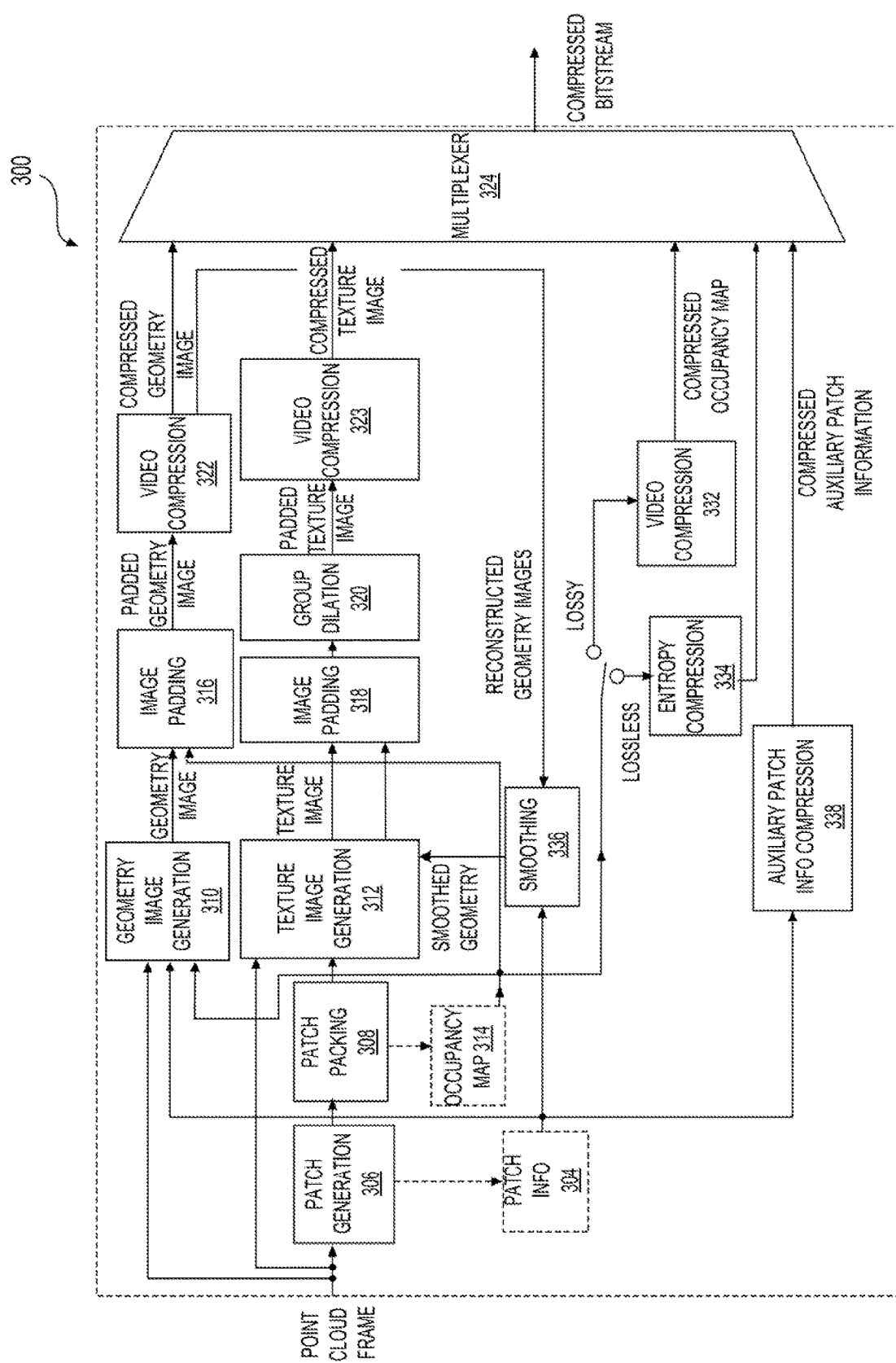
FIG. 3 shows a block diagram of an encoder for encoding point cloud frames, according to some embodiments.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into an image-based representation along with some meta data (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

The patch info module (304) can collect the patch information that indicates sizes and shapes of the patches. In some examples, the patch information can be packed into an image frame and then encoded by the auxiliary patch info compression module (338) to generate the compressed auxiliary patch information.

The patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate while does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, the compressed auxiliary patch information into a compressed bitstream.

Figure 4:
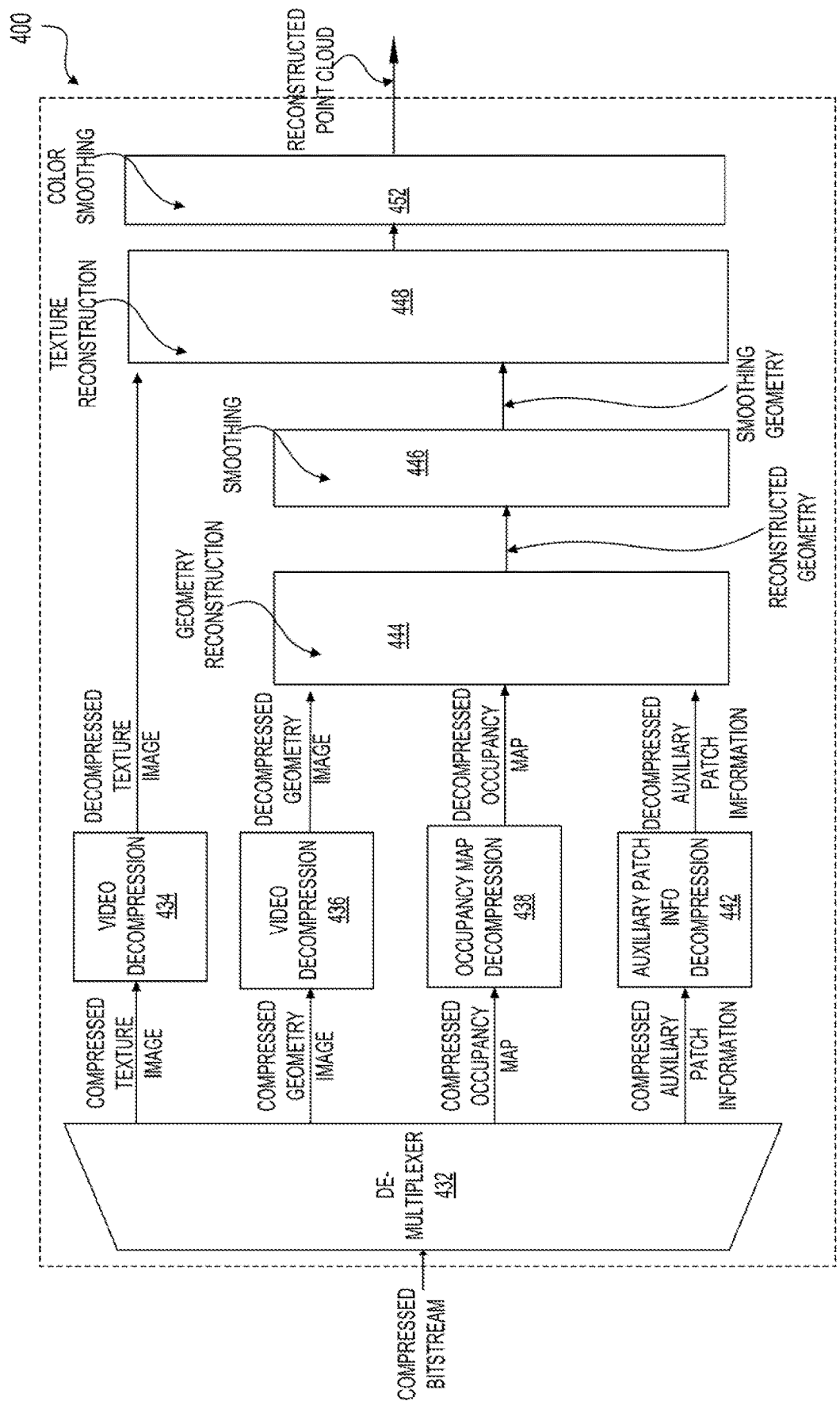
FIG. 4 shows a block diagram of a decoder for decoding a compressed bitstream corresponding to point cloud frames according to some embodiments.

FIG. 4 shows a block diagram of a V-PCC decoder (400) for decoding compressed bitstream corresponding to point cloud frames, according to some embodiments. In some embodiments, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
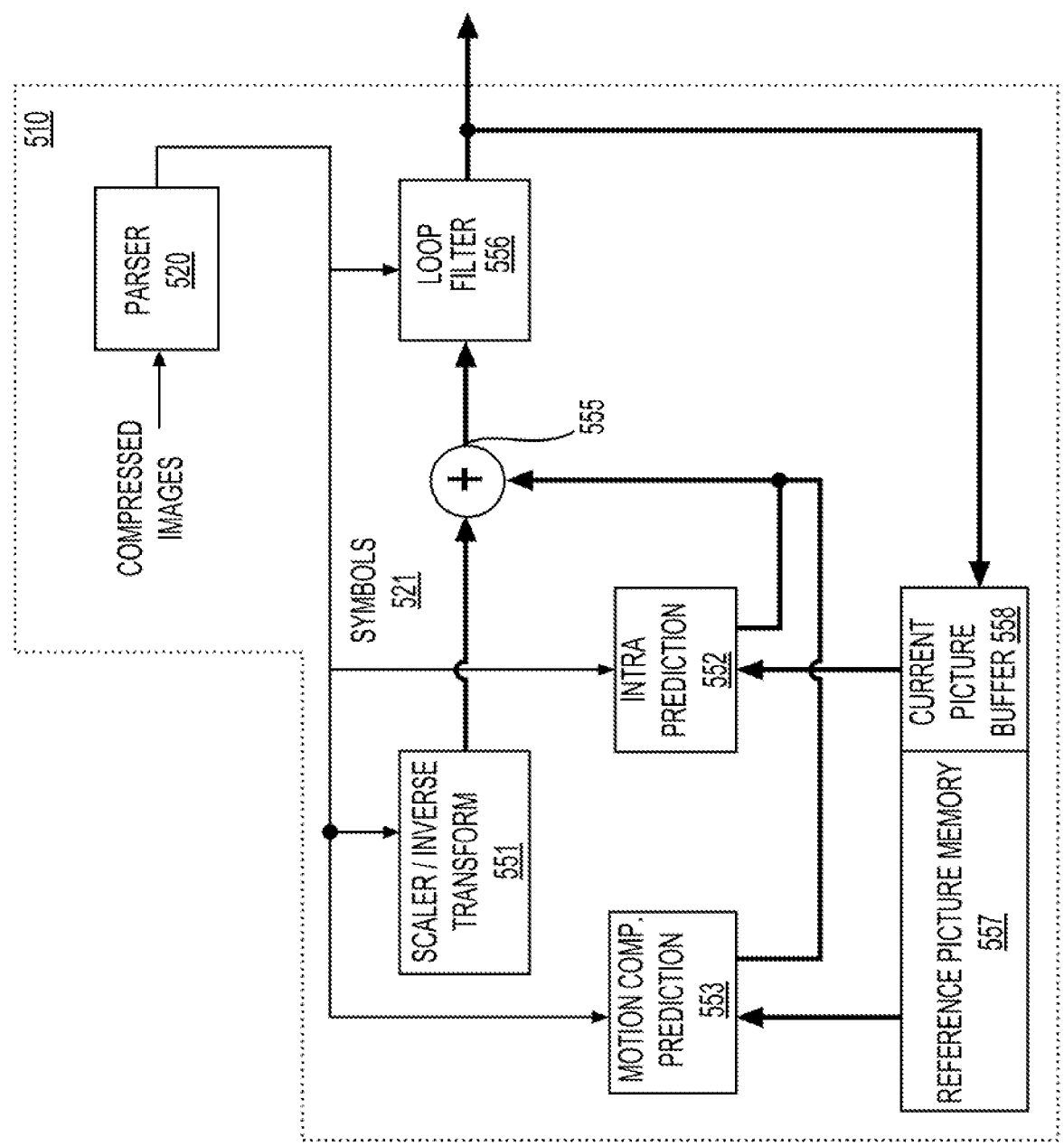
FIG. 5 is a schematic illustration of a simplified block diagram of a video decoder in accordance with an embodiment.

FIG. 5 shows a block diagram of a video decoder (510) according to an embodiment of the present disclosure. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
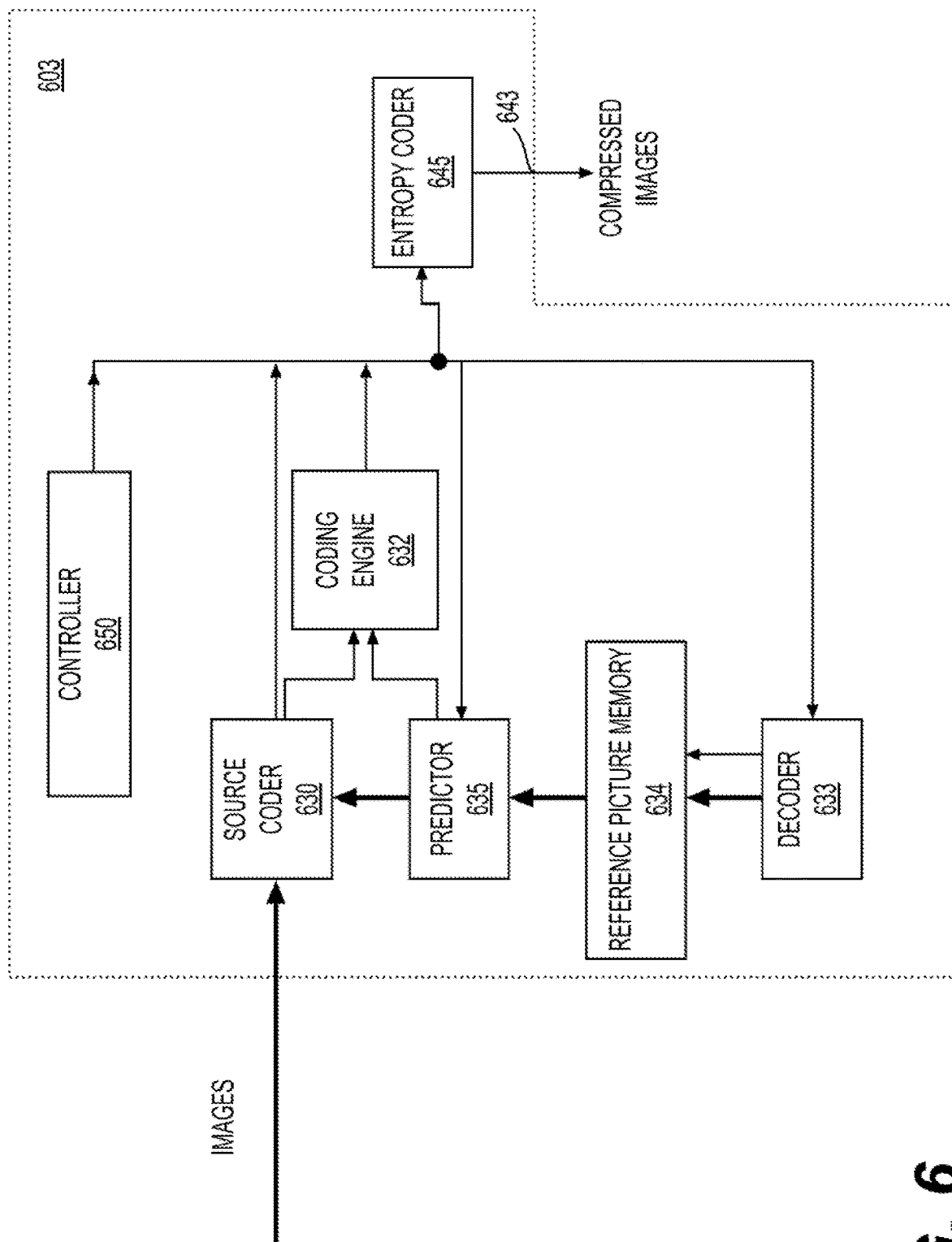
FIG. 6 is a schematic illustration of a simplified block diagram of a video encoder in accordance with an embodiment.

FIG. 6 shows a block diagram of a video encoder (603) according to an embodiment of the present disclosure. The video encoder (603) can be used in the V-PCC encoder (300) that compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
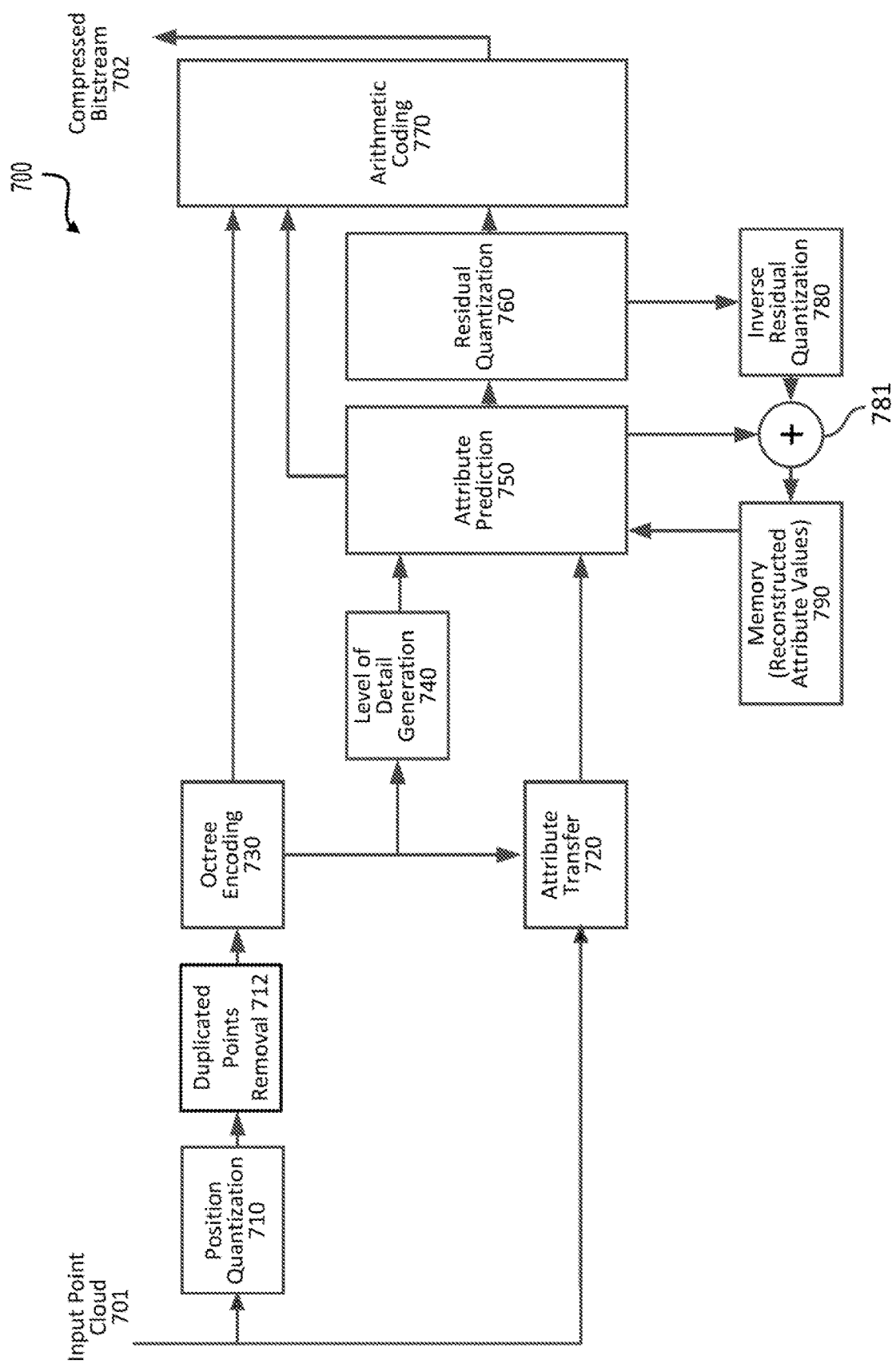
FIG. 7 shows a block diagram of an encoder for encoding point cloud frames, according to some embodiments.

FIG. 7 shows a block diagram of a G-PPC encoder (700) in accordance with some embodiments. The encoder (700) can be configured to receive point cloud data and compress the point cloud data to generate a bit stream carrying compressed point cloud data. In an embodiment, the encoder (700) can include a position quantization module (710), a duplicated points removal module (712), an octree encoding module (730), an attribute transfer module (720), a level of detail (LOD) generation module (740), an attribute prediction module (750), a residual quantization module (760), an arithmetic coding module (770), an inverse residual quantization module (780), an addition module (781), and a memory (790) to store reconstructed attribute values.

As shown, an input point cloud (701) can be received at the encoder (700). Positions (e.g., 3D coordinates) of the point cloud (701) are provided to the quantization module (710). The quantization module (710) is configured to quantize the coordinates to generate quantized positions. The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the attribute prediction module (750). The LOD generation module (740) is configured to operate on the re-ordered points output from the octree encoding module (730), and re-organize the points into different LODs. LOD information is supplied to the attribute prediction module (750).

The attribute prediction module (750) processes the points according to an LOD-based order indicated by the LOD information from the LOD generation module (740). The attribute prediction module (750) generates an attribute prediction for a current point based on reconstructed attributes of a set of neighboring points of the current point stored in the memory (790). Prediction residuals can subsequently be obtained based on original attribute values received from the attribute transfer module (720) and locally generated attribute predictions. When candidate indices are used in the respective attribute prediction process, an index corresponding to a selected prediction candidate may be provided to the arithmetic coding module (770).

The residual quantization module (760) is configured to receive the prediction residuals from the attribute prediction module (750), and perform quantization to generate quantized residuals. The quantized residuals are provided to the arithmetic coding module (770).

The inverse residual quantization module (780) is configured to receive the quantized residuals from the residual quantization module (760), and generate reconstructed prediction residuals by performing an inverse of the quantization operations performed at the residual quantization module (760). The addition module (781) is configured to receive the reconstructed prediction residuals from the inverse residual quantization module (780), and the respective attribute predictions from the attribute prediction module (750). By combining the reconstructed prediction residuals and the attribute predictions, the reconstructed attribute values are generated and stored to the memory (790).

The arithmetic coding module (770) is configured to receive the occupancy codes, the candidate indices (if used), the quantized residuals (if generated), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

Figure 8:
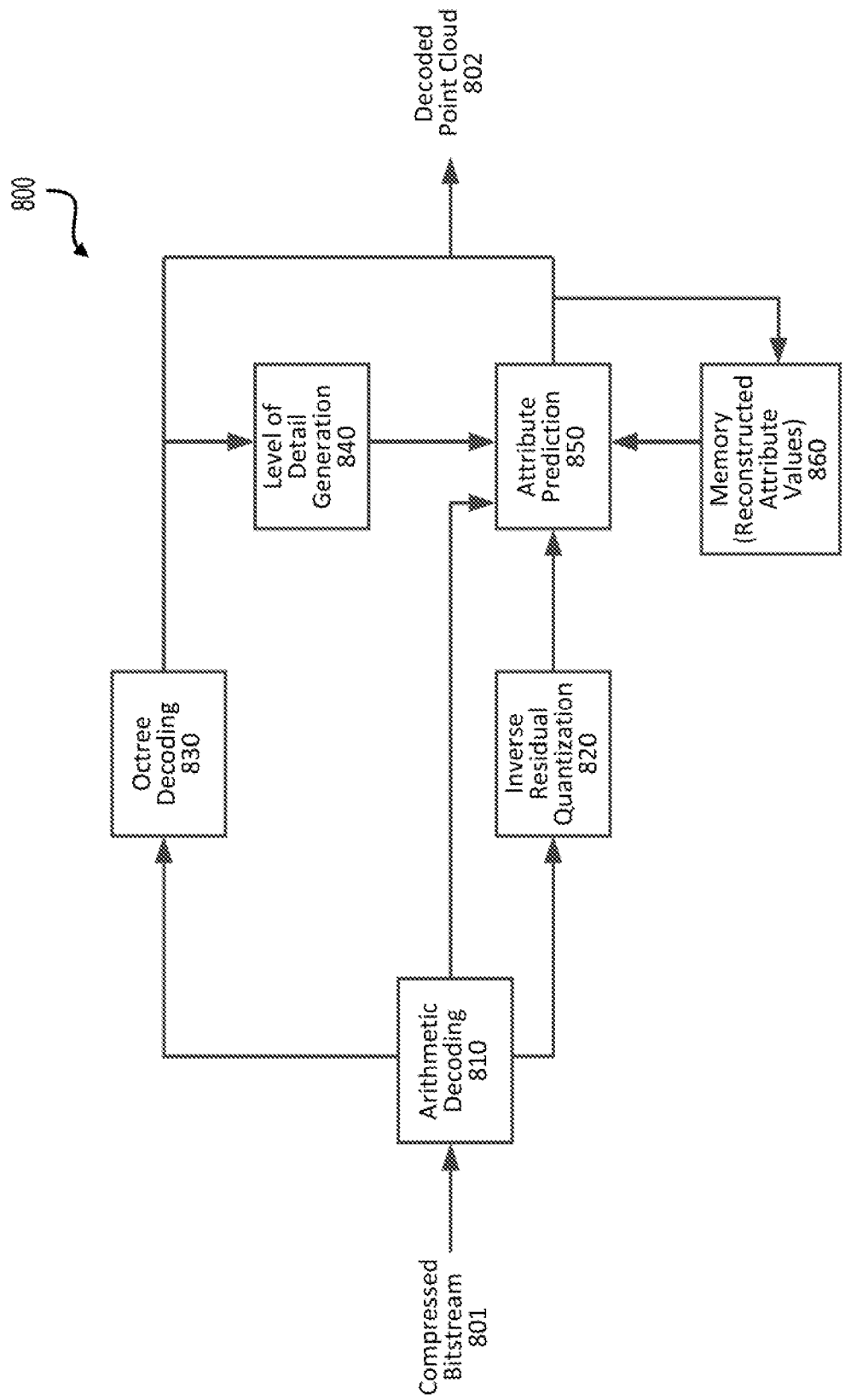
FIG. 8 shows a block diagram of a decoder for decoding a compressed bitstream corresponding to point cloud frames according to some embodiments.

FIG. 8 shows a block diagram of a G-PCC decoder (800) in accordance with an embodiment. The decoder (800) can be configured to receive a compressed bitstream and perform point cloud data decompression to decompress the bitstream to generate decoded point cloud data. In an embodiment, the decoder (800) can include an arithmetic decoding module (810), an inverse residual quantization module (820), an octree decoding module (830), an LOD generation module (840), an attribute prediction module (850), and a memory (860) to store reconstructed attribute values.

As shown, a compressed bitstream (801) can be received at the arithmetic decoding module (810). The arithmetic decoding module (810) is configured to decode the compressed bitstream (801) to obtain quantized residuals (if generated) and occupancy codes of a point cloud. The octree decoding module (830) is configured to determine reconstructed positions of points in the point cloud according to the occupancy codes. The LOD generation module (840) is configured to re-organize the points into different LODs based on the reconstructed positions, and determine an LOD-based order. The inverse residual quantization module (820) is configured to generate reconstructed residuals based on the quantized residuals received from the arithmetic decoding module (810).

The attribute prediction module (850) is configured to perform an attribute prediction process to determine attribute predictions for the points according to the LOD-based order. For example, an attribute prediction of a current point can be determined based on reconstructed attribute values of neighboring points of the current point stored in the memory (860). In some examples, the attribute prediction can be combined with a respective reconstructed residual to generate a reconstructed attribute for the current point.

A sequence of reconstructed attributes generated from the attribute prediction module (850) together with the reconstructed positions generated from the octree decoding module (830) corresponds to a decoded point cloud (802) that is output from the decoder (800) in one example. In addition, the reconstructed attributes are also stored into the memory (860) and can be subsequently used for deriving attribute predictions for subsequent points.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

It is noted that the attribute prediction modules (750) and (850) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

According to some aspects of the disclosure, the above PCC (e.g., G-PCC, V-PCC) encoders and decoders can be used in frameworks for mesh compression. Some aspects of the disclosure provide frameworks that use PCC encoders and decoders for mesh compression, such as static mesh compression, dynamic mesh compression, compression of a dynamic mesh with constant connectivity information, compression of a dynamic mesh with time varying connectivity information, compression of a dynamic mesh with time varying attribute maps, and the like.

Figure 9:
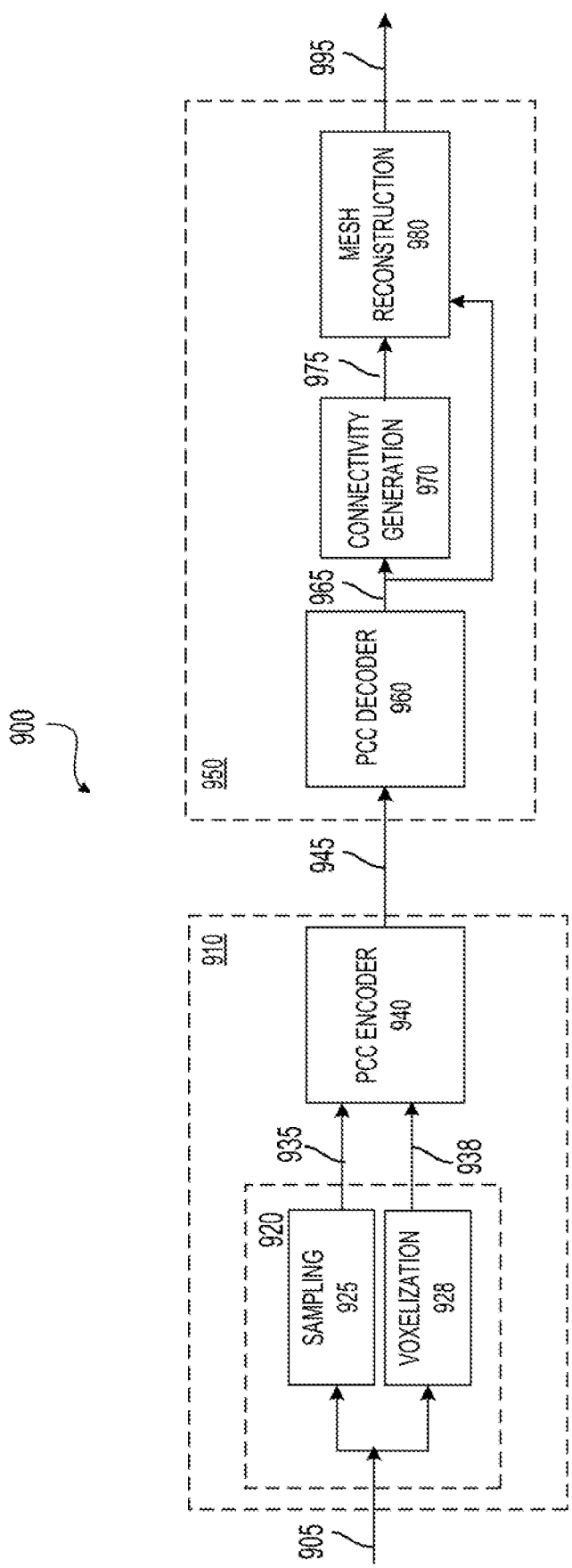
FIG. 9 shows a diagram of a framework for mesh compression according to some embodiments of the disclosure.

FIG. 9 shows a diagram of a framework (900) for mesh compression according to some embodiments of the disclosure. The framework (900) includes a mesh encoder (910) and a mesh decoder (950). The mesh encoder (910) encodes an input mesh (905) (a mesh frame in case of a dynamic mesh) into a bitstream (945), and the mesh decoder (950) decodes the bitstream (945) to generate a reconstructed mesh (995) (a mesh frame in case of a dynamic mesh).

The mesh encoder (910) can be any suitable device, such as a computer, a server computer, a desktop computer, a laptop computer, a tablet computer, a smart phone, a gaming device, an AR device, a VR device, and the like. The mesh decoder (950) can be any suitable device, such as a computer, a client computer, a desktop computer, a laptop computer, a tablet computer, a smart phone, a gaming device, an AR device, a VR device, and the like. The bitstream (945) can be transmitted from the mesh encoder (910) to the mesh decoder (950) via any suitable communication network (not shown).

In the FIG. 9 example, the mesh encoder (910) includes a converter (920) and PCC encoder (940) coupled together.

The converter (920) is configured to convert the input mesh (905) to a point cloud. In an example, the converter (920) includes a sampling module (925). The sampling module (925) can sample points from polygons of the input mesh (905) to generate a point cloud (935).

In another example, the converter (920) includes a voxelization module (928). The voxelization module (928) can convert the input mesh (905) into a voxelized mesh. In an example, the voxelization module (928) can convert the input mesh (905) to the voxelized mesh that includes a collection of equally-sized blocks on a 3D grid. The voxelized mesh can hold information about volume and connectivity. It is noted that, in some examples, vertices in the voxelized mesh can have a single connected representation, and connectivity information of the vertices in the voxelized mesh can be inferred based on the geometry information of the vertices. In some examples, the vertices of the voxelized mesh are provided as a point cloud (938) to the PCC encoder 940.

In another example, the converter (920) is configured in a hybrid manner. For example, the input mesh (905) includes (or is partitioned into) first portions and second portions. The first portions are converted to the point cloud (935) (referred to as a first point cloud (935)) by the sampling module (925), and the second portions are converted to the point cloud (938) (referred to as a second point cloud (938)) by the voxelization module (928). The first point cloud (935) and the second point cloud (938) are suitably combined and provided to the PCC encoder (940).

According to an aspect of the disclosure, attributes of each point in the generated point cloud(s), such as the first point cloud (935) and/or the second point cloud (938), can be derived from the input mesh (905). For example, the colors of each point in the generated point cloud(s), such as the first point cloud (935) and/or the second point cloud (938), can be derived from the texture map associated with the input mesh (905) by interpolations on the texture map given texture coordinates (u,v). The attributes associated with the generated points (in the first point cloud (935) and/or the second point cloud (938)), such as normal, color, reflectance, and the like can be provided with the points (in the first point cloud (935) and/or the second point cloud (938)) to the PCC encoder (940) for encoding.

The PCC encoder (940) then encodes the generated point cloud(s), such as the first point cloud (935) and/or the second point cloud (938) to generate the bitstream (945) that carries the encoded input mesh. The PCC encoder (940) can be any suitable PCC encoder, such as V-PCC encoder, G-PCC encoder, and the like.

In the FIG. 9 example, the bitstream (945) is provided to the mesh decoder (950). The mesh decoder (950) includes a PCC decoder (960), a connectivity generation module (970) and a mesh reconstruction module (980). In an example, the PCC decoder (960) corresponds the PCC encoder (940), and can decode the bitstream (945) that is encoded by the PCC encoder (940). The PCC decoder (960) can generate a point cloud (965) with points that are vertices for a mesh.

The connectivity generation module (970) can estimate the connectivity (topology) from the decoded points (vertices in the context of a mesh) in the point cloud (965). It is noted that any suitable algorithm can be used by the connectivity generation module (970) to estimate the connectivity information (975) of the vertices.

In the FIG. 9 example, the decoded points (965) and the connectivity information (975) are provided to the mesh reconstruction module (980). The mesh reconstruction module (980) generates the reconstructed mesh (995) based on the decoded points (965) that correspond to vertices and the connectivity information (975).

It is noted that components in the mesh encoder (910), such as the sampling module (925), the voxelization module (928), the PCC encoder (940) can be respectively implemented by various techniques. In an example, a component is implemented by integrated circuitry. In another example, a component is implemented using software that can be executed by one or more processors.

It is noted that components in the mesh decoder (950), such as the PCC decoder (960), the connectivity generation module (970), the mesh reconstruction module (980) can be respectively implemented by various techniques. In an example, a component is implemented by integrated circuitry. In another example, a component is implemented using software that can be executed by one or more processors.

Figure 10:
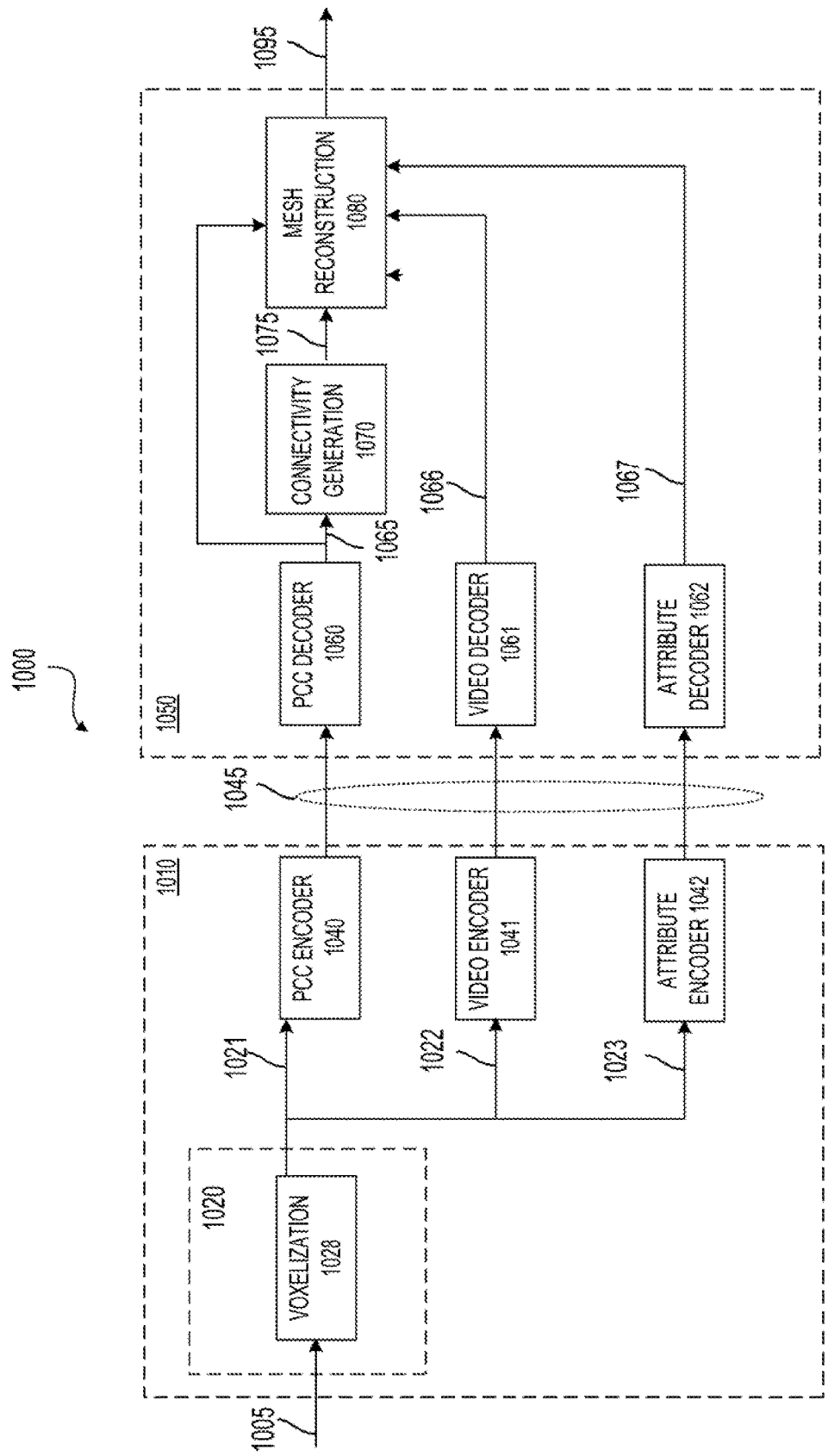
FIG. 10 shows another diagram of a framework for mesh compression according to some embodiments of the disclosure.

FIG. 10 shows a diagram of a framework (1000) for mesh compression according to some embodiments of the disclosure. The framework (1000) includes a mesh encoder (1010) and a mesh decoder (1050). The mesh encoder (1010) encodes an input mesh (1005) (a mesh frame in case of a dynamic mesh) into a bitstream (1045), and the mesh decoder (1050) decodes the bitstream (1045) to generate a reconstructed mesh (1095) (a mesh frame in case of a dynamic mesh).

The mesh encoder (1010) can be any suitable device, such as a computer, a server computer, a desktop computer, a laptop computer, a tablet computer, a smart phone, a gaming device, an AR device, a VR device, and the like. The mesh decoder (1050) can be any suitable device, such as a computer, a client computer, a desktop computer, a laptop computer, a tablet computer, a smart phone, a gaming device, an AR device, a VR device, and the like. The bitstream (945) can be transmitted from the mesh encoder (1010) to the mesh decoder (1050) via a network (not shown).

In the FIG. 10 example, the mesh encoder (1010) includes a converter (1020), and a plurality of encoders, such as a PCC encoder (1040), a video encoder (1041), an attribute encoder (1042) and the like.

The converter (1020) is configured to convert the input mesh (1005) to suitable intermedia data having multiple sections for encoding by the plurality of encoders. In an example, the converter (1020) includes a voxelization module (1028). The voxelization module (1028) can convert the input mesh (1005) into a voxelized mesh. In an example, the voxelization module (1028) can convert the input mesh (1005) to the voxelized mesh that includes a collection of equally-sized blocks on a 3D grid. The voxelized mesh can hold information about volume and connectivity.

In an example, information of the voxelized mesh can be converted into vertices (1021), texture maps (1022) and other attributes (1023). The vertices (1021) can include geometry information of the vertices, such as (x,y,z) coordinates that describe the positions of the vertices. The vertices (1021) can also include the vertex attributes, such as normal, color reflectance, and the like. The texture maps (1022) (also referred to as attribute maps in some examples) are attributes associated with mesh surface. In some examples, the texture maps (1022) for a sequence of mesh frames can form a video sequence. The other attributes (1023) can include attributes that may not be able to be coded by PCC encoders. In some examples, the other attributes (1023) includes mapping information, such as the texture coordinates (u,v).

According to an aspect of the disclosure, the vertices (1021) can be viewed as a point cloud and can be coded by the PCC encoder (1040). The PCC encoder (1040) can be any suitable PCC encoder, such as V-PCC encoder, G-PCC, and the like. It is noted that the vertex attributes (attributes associated with vertices), such as normal, color, reflectance, and the like, can be encoded by PCC encoder (1040).

The texture maps (1022) can be viewed as a video sequence and can be encoded by the video encoder (1041). In some examples, the texture maps (1022) can be different from the original texture maps in the input mesh (1005). The texture maps (1022) can be generated by any suitable algorithms.

The other attributes (1023) that may not be able to be coded by the PCC encoder (1040) and the video encoder (1041), can be encoded by the attribute encoder (1042). The attribute encoder (1042) can be implemented with any other attribute encoding techniques that are suitable for encoding the other attributes (1023). For example, the other attributes (1023) includes the texture coordinates (u,v), and the attribute encoder (1042) is configured to encode the texture coordinates (u,v).

In the FIG. 10 example, the encoded outputs from the PCC encoder 1040, the video encoder (1041) and the attribute encoder (1042) are mixed (e.g., multiplexed) into the bitstream (1045) that carries the encoded mesh for the input mesh (1005).

In the FIG. 10 example, the mesh decoder (1050) can demultiplex the bitstream (1045) into sections to be decoded respectively by a plurality of decoders, such as a PCC decoder (1060), a video decoder (1061) and an attribute decoder (1062).

In an example, the PCC decoder (1060) corresponds the PCC encoder (1040), and can decode a section of the bitstream (1045) that is encoded by the PCC encoder (1040). The PCC decoder (1060) can generate a point cloud (1065) with points that are vertices for a mesh.

The connectivity generation module (1070) can estimate the connectivity information (1075) (also referred to as topology) from the decoded points (vertices in the context of a mesh) in the point cloud (1065). It is noted that any suitable algorithm can be used by the connectivity generation module (1070) to estimate the connectivity information of the vertices.

In the FIG. 10 example, the point cloud (1065) and the connectivity information (1075) are provided to the mesh reconstruction module (1080).

In an example, the video decoder (1061) corresponds the video encoder (1041), and can decode a section of the bitstream (1045) that is encoded by the video encoder (1041). The video decoder (1061) can generate decoded texture maps (1066). The decoded texture maps (1066) are provided to the mesh reconstruction module (1080).

In an example, the attribute decoder (1062) corresponds the attribute encoder (1042), and can decode a section of the bitstream (1045) that is encoded by the attribute encoder (1042). The attribute decoder (1062) can generate decoded attributes (1067). The decoded attributes (1067) are provided to the mesh reconstruction module (1080).

The mesh reconstruction module (1080) receives the point cloud (1065), the connectivity information (1075), the decoded texture maps (1066) and the decoded attributes (1067), and generates the reconstructed mesh (1095) accordingly. For example, the point cloud (1065) from the PCC decoder (1060) can provide geometry information of the vertices and the vertex attributes for the reconstruction of the reconstructed mesh (1095); the connectivity information (1075) determined by the connectivity generation module (1070) can provide connectivity information for the reconstruction of the reconstructed mesh (1095); the decoded texture maps (1066) can provide texture maps for the reconstruction of the reconstructed mesh (1095) and the decoded attributes (1067) can provide other attributes for the reconstruction of the reconstructed mesh (1095).

It is noted that components in the mesh encoder (1010), such as the converter (1020), the voxelization module (1028), the PCC encoder (1040), the video encoder (1041), and the attribute encoder (1042) can be respectively implemented by various techniques. In an example, a component is implemented by integrated circuitry. In another example, a component is implemented using software that can be executed by one or more processors.

It is noted that components in the mesh decoder (1050), such as the PCC decoder (1060), the connectivity generation module (1070), the mesh reconstruction module (1080), the video decoder (1061), the attribute decoder (1062) can be respectively implemented by various techniques. In an example, a component is implemented by integrated circuitry. In another example, a component is implemented using software that can be executed by one or more processors.

Figure 11:
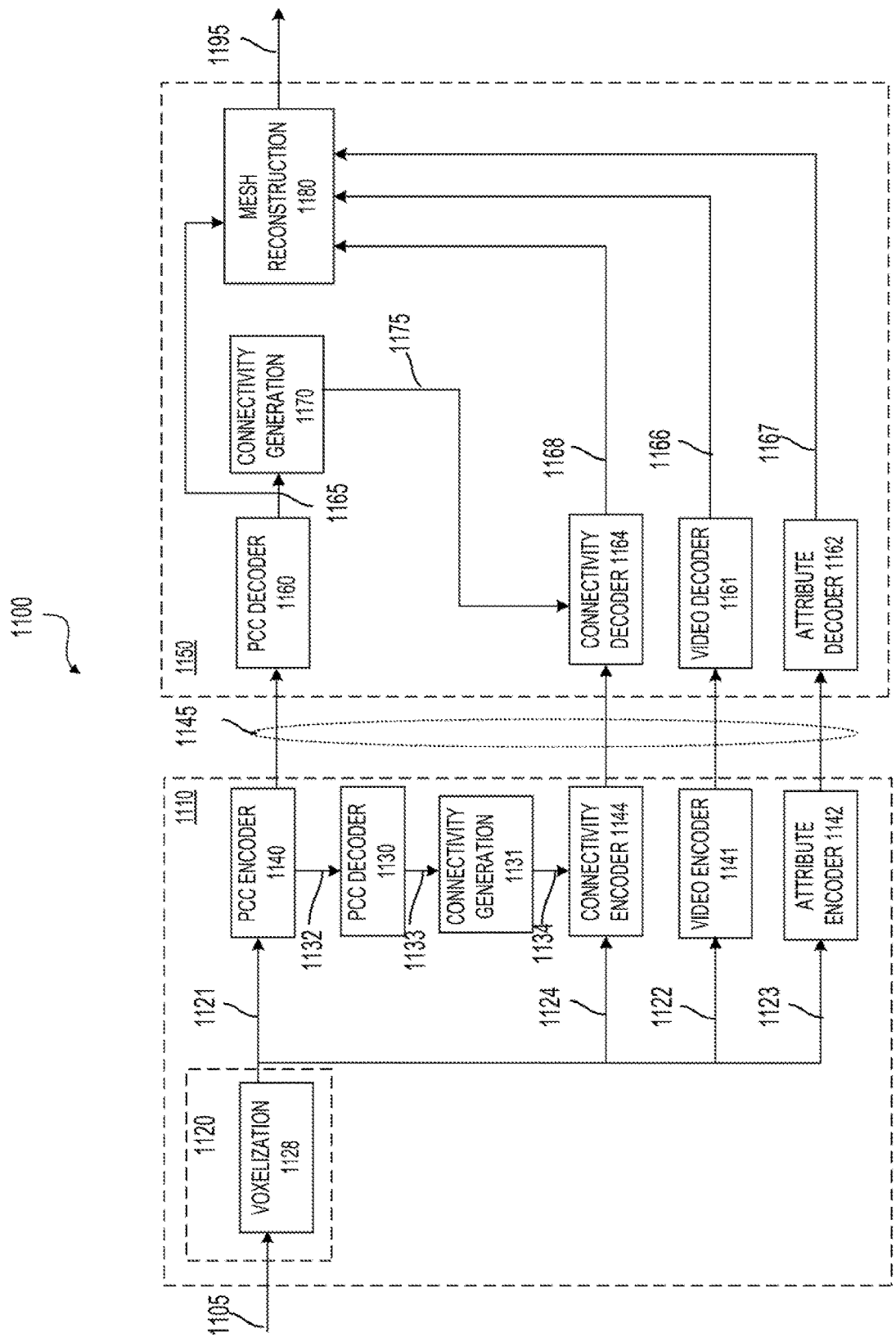
FIG. 11 shows another diagram of a framework for mesh compression according to some embodiments of the disclosure.

FIG. 11 shows a diagram of a framework (1100) for mesh compression according to some embodiments of the disclosure. The framework (1100) includes a mesh encoder (1110) and a mesh decoder (1150). The mesh encoder (1110) encodes an input mesh (1105) (mesh frame in case of a dynamic mesh) into a bitstream (1145), and the mesh decoder (1150) decodes the bitstream (1145) to generate a reconstructed mesh (1195) (mesh frame in case of a dynamic mesh).

The mesh encoder (1110) can be any suitable device, such as a computer, a server computer, a desktop computer, a laptop computer, a tablet computer, a smart phone, a gaming device, an AR device, a VR device, and the like. The mesh decoder (1150) can be any suitable device, such as a computer, a client computer, a desktop computer, a laptop computer, a tablet computer, a smart phone, a gaming device, an AR device, a VR device, and the like. The bitstream (945) can be transmitted from the mesh encoder (1110) to the mesh decoder (1150) via a network (not shown).

In the FIG. 11 example, the mesh encoder (1110) includes a converter (1120), and a plurality of encoders, such as a PCC encoder (1140), a video encoder (1141), an attribute encoder (1142), a connectivity encoder (1144) and the like. In addition, the mesh encoder includes a PCC decoder (1130) and a connectivity generation module (1131).

The converter (1120) is configured to convert the input mesh (1105) to suitable intermedia data having multiple sections for encoding by the plurality of encoders. In an example, the converter (1120) includes a voxelization module (1128). The voxelization module (1128) can convert the input mesh (1105) into a voxelized mesh. In an example, the voxelization module (1128) can convert the input mesh (1105) to the voxelized mesh that includes a collection of equally-sized blocks on a 3D grid. The voxelized mesh can hold information about volume and connectivity.

In an example, information of the voxelized mesh can be converted into vertices (1121), connectivity information (1124), texture maps (1122), other attributes (1123). The vertices (1121) can include geometry information of the vertices, such as (x,y,z) coordinates that describe the positions of the vertices. The vertices (1121) can also include the vertex attributes, such as normal, color reflectance, and the like. The connectivity information (1124) (also referred to as topology in some examples) includes connectivity information of the voxelized mesh. The texture maps (1122) (also referred to as attribute maps in some examples) are attributes associated with mesh surface and texture maps (1122) can be a video sequence. The other attributes (1123) can include attributes that may not be able to be coded by PCC encoder (1140) and the video encoder (1141). In some examples, the other attributes (1123) includes mapping information, such as the texture coordinates (u,v).

According to an aspect of the disclosure, the vertices (1121) can be viewed as a point cloud and can be coded by the PCC encoder (1140). The PCC encoder (1140) can be any suitable PCC encoder, such as V-PCC encoder, G-PCC, and the like. It is noted that the vertex attributes (attributes associated with vertices), such as normal, color, reflectance, and the like, can be encoded by PCC encoder (1140).

According to an aspect of the disclosure, the connectivity encoder (1144) is configured to encode a connectivity difference between the connectivity information (1124) (also referred to as original connectivity information) and an estimated connectivity information (1134). In the FIG. 11 example, the mesh encoder (1100) includes the PCC decoder (1130) and the connectivity generation module (1131) to generate the estimated connectivity information (1134). In an example, the PCC decoder (1130) corresponds the PCC encoder (1140). The PCC decoder (1130) can decode that is encoded by the PCC encoder (1140). The PCC decoder (1130) can receive a copy (1132) of encoded point cloud and generate a point cloud (1133) with points that are vertices for a mesh.

The connectivity generation module (1131) can generate the estimated connectivity information (1134) from the decoded points (vertices in the context of a mesh) in the point cloud (1133). The connectivity generation module (1131) can estimate and generate the estimated connectivity information (1134) by any suitable algorithm. The connectivity encoder (1144) receives the original connectivity information (1124) and the estimated connectivity information (1134) and encodes a difference between the estimated connectivity information (1134) and the original connectivity information (1124) in the bitstream (1145).

The texture maps (1122) can be viewed as a video sequence and can be encoded by the video encoder (1141). In some examples, the texture maps (1122) can be different from the original texture maps in the input mesh (1105). The texture maps (1122) can be generated by any suitable algorithms.

The other attributes (1123) that may not be able to be coded by the PCC encoder (1140) and the video encoder (1141), can be encoded by the attribute encoder (1142). The attribute encoder (1142) can be implemented with any other attribute encoding techniques that are suitable for encoding the other attributes (1123). For example, the other attributes (1123) includes the texture coordinates (u,v), and the attribute encoder (1142) is configured to encode the texture coordinates (u,v).

In the FIG. 11 example, the encoded outputs from the PCC encoder (1140), the connectivity encoder (1144), the video encoder (1141) and the attribute encoder (1142) are mixed (e.g., multiplexed) into the bitstream (1145) that carries the encoded mesh corresponding to the input mesh (1105).

In the FIG. 11 example, the mesh decoder (1150) can demultiplex the bitstream (1145) into sections to be decoded respectively by a plurality of decoders, such as a PCC decoder (1160), a connectivity decoder (1164), a video decoder (1161) and an attribute decoder (1162).

In an example, the PCC decoder (1160) corresponds the PCC encoder (1140), and can decode a section of the bitstream (1145) that is encoded by the PCC encoder (1140). The PCC decoder (1160) can generate a point cloud (1165) with points that are vertices for a mesh.

The connectivity generation module (1170) can estimate the connectivity (topology) from the decoded points (vertices in the context of a mesh) in the point cloud (1165) and output estimated connectivity information (1175). It is noted that any suitable algorithm can be used by the connectivity generation module (1170) to determine the estimated connectivity information (1175) of the vertices.

In the FIG. 11 example, the decoded point cloud (1165) and the estimated connectivity information (1175) are provided to the mesh reconstruction module (1180). The estimated connectivity information (1175) is also provided to the connectivity decoder (1164).

The connectivity decoder (1164) corresponds to the connectivity encoder (1144), and can decode a section of the bitstream (1145) that is encoded by the connectivity encoder (1144), which is a connectivity difference. The connectivity decoder (1164) can combine the connectivity difference with the estimated connectivity information (1175) and output combined connectivity information (1168). The combined connectivity information can be provided to the mesh reconstruction module (1180).

According to an aspect of the disclosure, the PCC decoder (1130) and the PCC decoder (1160) can use the same decoding algorithm. Further, the connectivity generation module (1131) and the connectivity generation module (1170) can use the same connectivity estimation algorithm.

In an example, the video decoder (1161) corresponds the video encoder (1141), and can decode a section of the bitstream (1145) that is encoded by the video encoder (1141). The video decoder (1161) can generate decoded texture maps (1166). The decoded texture maps (1166) are provided to the mesh reconstruction module (1180).

In an example, the attribute decoder (1162) corresponds the attribute encoder (1142), and can decode a section of the bitstream (1145) that is encoded by the attribute encoder (1142). The attribute decoder (1162) can generate decoded attributes (1167). The decoded attributes (1167) are provided to the mesh reconstruction module (1180).

The mesh reconstruction module (1180) receives the decoded point cloud (1165), the combined connectivity information (1168), the decoded texture maps (1166) and the decoded attributes (1167), and generates the reconstructed mesh (1195) accordingly. For example, the decoded points from the PCC decoder (1160) can provide geometry information of the vertices and the vertex attributes for the reconstruction of the reconstructed mesh (1195); the combined connectivity information (1168) determined by the connectivity decoder (1164) can provide connectivity information for the reconstruction of the reconstructed mesh (1195); the decoded texture maps (1166) can provide texture maps for the reconstruction of the reconstructed mesh (1195) and the decoded attributes (1167) can provide other attributes for the reconstruction of the reconstructed mesh (1195).

It is noted that components in the mesh encoder (1110), such as the converter (1120), the voxelization module (1128), the PCC encoder (1140), the video encoder (1141), the attribute encoder (1142), the PCC decoder (1130), the connectivity generation module (1131), the connectivity encoder (1144), can be respectively implemented by various techniques. In an example, a component is implemented by integrated circuitry. In another example, a component is implemented using software that can be executed by one or more processors.

It is noted that components in the mesh decoder (1150), such as the PCC decoder (1160), the connectivity generation module (1170), the mesh reconstruction module (1180), the video decoder (1161), the attribute decoder (1162), the connectivity decoder (1164), can be respectively implemented by various techniques. In an example, a component is implemented by integrated circuitry. In another example, a component is implemented using software that can be executed by one or more processors.

According to some aspects of the disclosure, a dynamic mesh can have time varying connectivity information, and interframe predictions (interframe connectivity predictions) can be used to code the time varying connectivity information.

In some examples, a dynamic mesh includes a sequence of mesh frames. For the sequence of mesh frames, the connectivity information can be coded by interframe connectivity prediction, and the differences of topology (connectivity information) between a current frame and reference frames are coded in the bitstream. In an example, when the connectivity information between consecutive mesh frames does not change much, coding the difference and using interframe connectivity prediction can achieve high degree of compression for coding connectivity information.

In some embodiments, the connectivity information of a first mesh frame in a sequence of mesh frames is encoded in a bitstream, for example, using the techniques in the framework (900), the framework (1000), the framework (1100). For each of the following mesh frames, the connectivity difference between a current mesh frame and a previous mesh frame is encoded in the bitstream.

On the decoder side, the connectivity information of the first mesh frame in the sequence of mesh frames is decoded from the bitstream, for example, using the techniques in the framework (900), the framework (1000), the framework (1100). Then, for each of the other mesh frames, the connectivity difference between the current mesh frame and a previous mesh frame is decoded from the bitstream. The connectivity difference is combined with the connectivity information of the previous mesh frame to obtain the connectivity information of the current mesh frame.

In some embodiments, one or more flags can be used to indicate whether the interframe connectivity prediction is applied on the dynamic mesh or on a portion of the dynamic mesh.

In some examples, a flag can be signaled in high-level syntax. In an example, a flag can be signaled in a sequence header of a sequence of mesh frames to indicate the interframe connectivity prediction is applied to the sequence of mesh frames in the dynamic mesh. In another example, a flag can be signaled in a slice header of a slice in a mesh frame to indicate that interframe connectivity prediction is applied to the slice in the mesh frame.

In some examples, a flag can be signaled in the bitstream to indicate that the connectivity information is not changed between two mesh frames.

In some embodiments, a mesh frame can be partitioned into multiple coding units that can be respectively coded. For each coding unit of a current mesh frame, a flag can be coded first to indicate whether the connectivity of the coding unit is changed between two mesh frames (between the current mesh frame and a reference mesh frame) or not. An index or motion vector may be also coded to indicate a reference coding unit in a reference mesh frame. If the connectivity information is changed over time, the differences of connectivity information between the current coding unit and the reference coding unit can be then signaled. Otherwise, the connectivity information of current coding unit can be inferred from that in reference coding unit in the reference mesh frame.

Figure 12:
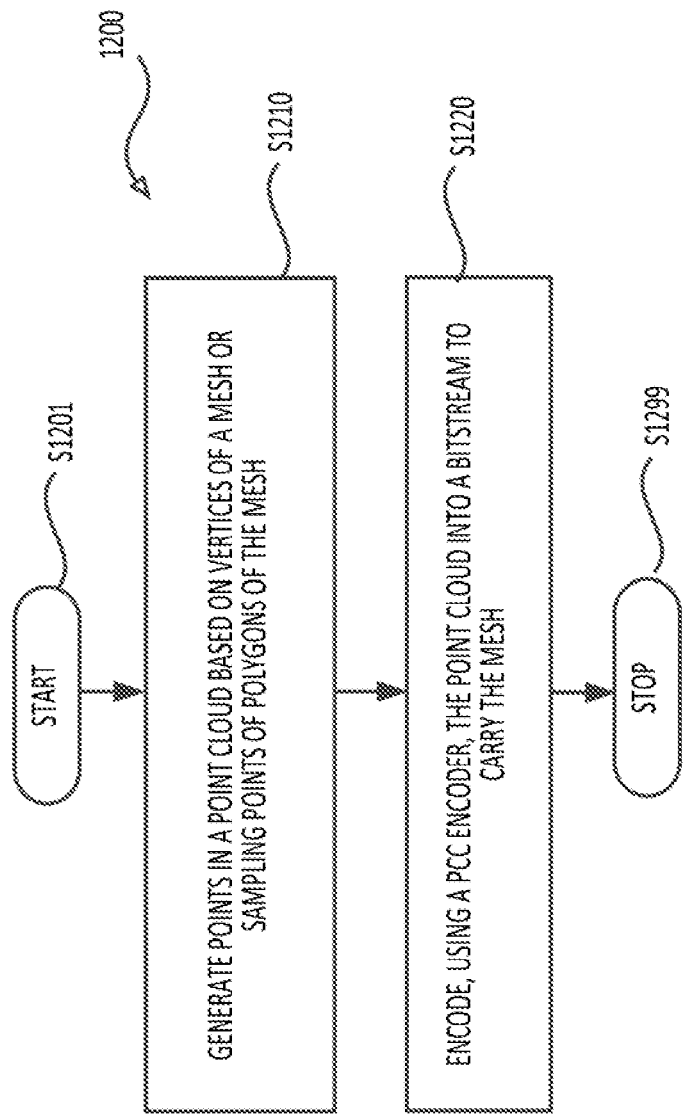
FIG. 12 shows a flow chart outlining a process example in accordance with some embodiments.

FIG. 12 shows a flow chart outlining a process (1200) according to an embodiment of the disclosure. The process (1200) can be used during an encoding process for a mesh. In various embodiments, the process (1200) is executed by processing circuitry. In some embodiments, the process (1200) is implemented in software instructions, thus when the processing circuitry executes the software instructions, the processing circuitry performs the process (1200). The process starts at (S1201) and proceeds to (S1210).

At (S1210), a mesh is converted to a point cloud with points generated based on the mesh.

In some examples, polygons in the mesh are sampled to generate sampled points as the points in the point cloud. In some examples, the mesh is voxelized to generate a voxelized mesh. Vertices of the voxelized mesh can form the points in the point cloud. In some examples, some points in the point cloud are generated based on the sampling of the polygons and some points in the point cloud are vertices of the voxelized mesh.

At (S1220), the point cloud is encoded into a bitstream using a PCC encoder. The bitstream carries information of the mesh.

In some embodiments, the mesh is converted into multiple sections that are encoded by separate encoders, and the encoding results are mixed (e.g., multiplexed) into the bitstream.

In an example, one of the multiple sections includes texture maps (also referred to as attributes maps). The texture maps include attributes associated with the surface of the mesh, and can be encoded as a sequence of two dimensional (2D) images by a video encoder.

In another example, one of the multiple sections includes other attributes, such as texture coordinates corresponding to mapping information of the mesh. The other attributes can be encoded using an attribute encoder that is suitable for encoding the other attributes.

In some examples, one of the multiple sections includes connectivity information of the mesh. In an example, estimated connectivity information can be generated based on a decoded point cloud. Then, a connectivity difference between the connectivity information of the mesh and the estimated connectivity information is determined. The connectivity difference is encoded into the bitstream.

In some embodiments, interframe connectivity prediction is used to code connectivity information of a dynamic mesh. The dynamic mesh includes a sequence of mesh frames. In an example, an interframe connectivity prediction is determined for coding current connectivity information of a current mesh frame based on reference connectivity information of a reference mesh frame that has been reconstructed before the current mesh frame. In an example, an interframe connectivity difference between the current connectivity information and the reference connectivity information of the reference mesh frame is determined and coded in the bitstream.

In some embodiments, one or more flags can be coded into the bitstream to indicate whether the interframe connectivity prediction is applied on the dynamic mesh or on a portion of the dynamic mesh.

In some examples, a flag can be signaled in high-level syntax. In an example, a flag can be signaled in a sequence header of a sequence of mesh frames to indicate the interframe connectivity prediction is applied to the sequence of mesh frames in the dynamic mesh. In another example, a flag can be signaled in a slice header of a slice in a mesh frame to indicate that interframe connectivity prediction is applied to the slice in the mesh frame.

In some examples, when the current connectivity information of the current mesh frame has no difference to the reference connectivity information of the reference mesh frame, a flag can be signaled in the bitstream to indicate that the connectivity information is not changed between the current mesh frame and the reference mesh frame.

In some embodiments, a mesh frame can be partitioned into multiple coding units. For each coding unit of a current mesh frame, a flag can be coded into the bitstream to indicate whether the connectivity of the coding unit is changed between the current mesh frame and reference coding unit in a reference mesh frame. In some examples, an index or motion vector can be coded to indicate the reference coding unit in the reference mesh frame. When the connectivity information changes over time, the differences of connectivity information between the current coding unit and the reference coding unit can be then signaled in the bitstream. Otherwise, the connectivity of current coding unit can be inferred from the reference coding unit in reference mesh frame.

Then, the process proceeds to (S1299) and terminates.

The process (1200) can be suitably adapted. Step(s) in the process (1200) can be modified and/or omitted. Additional step(s) can be added. Any suitable order of implementation can be used.

Figure 13:
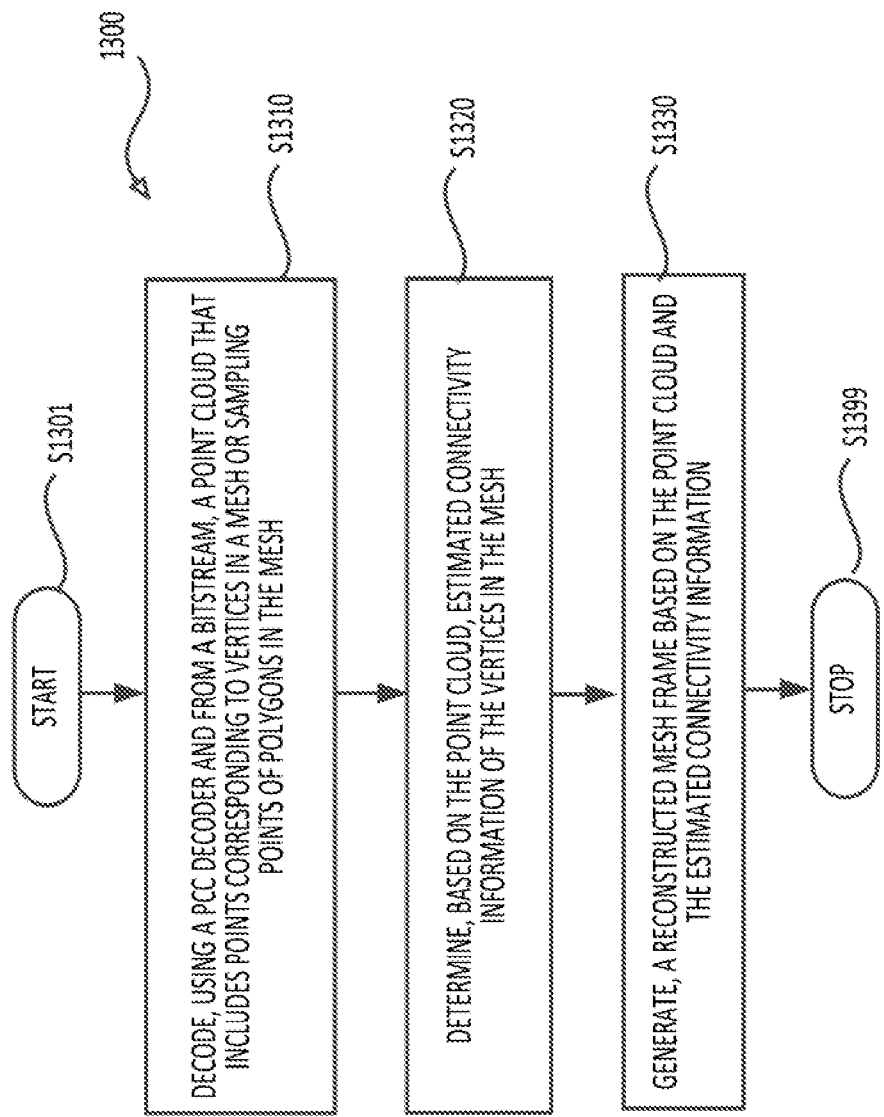
FIG. 13 shows a flow chart outlining a process example in accordance with some embodiments.

FIG. 13 shows a flow chart outlining a process (1300) according to an embodiment of the disclosure. The process (1300) can be used during a decoding process for a mesh. In various embodiments, the process (1300) is executed by processing circuitry. In some embodiments, the process (1300) is implemented in software instructions, thus when the processing circuitry executes the software instructions, the processing circuitry performs the process (1300). The process starts at (S1301) and proceeds to (S1310).

At (S1310), a PCC decoder is used to decode, from a bitstream, a point cloud that includes points corresponding to vertices in a mesh or sampling points of polygons in the mesh. In some examples, the points in the point cloud correspond to vertices of a voxelized mesh. In some examples, the points in the point cloud correspond to sampling points of polygons in a voxelized mesh. In some examples, some points in the point cloud correspond to vertices of a voxelized mesh, and some points in the point cloud correspond to sampling points of polygons in the voxelized mesh.

At (S1320), based on the point cloud, estimated connectivity information of the vertices in the mesh is determined (estimated). It is noted that any suitable algorithm can be used to determine the estimated connectivity information based on the point cloud.

At (S1330), a reconstructed mesh frame is generated based on the point cloud and the estimated connectivity information.

In some examples, a video decoder is used to decode, from the bitstream, a two directional (2D) image corresponding to a texture map of attributes associated with a surface of the mesh. The reconstructed mesh frame can be generated based on the point cloud, the estimated connectivity information, and the 2D image for a texture map.

In some examples, an attribute decoder is used to decode, from the bitstream, texture coordinates corresponding to mapping information of the mesh. The reconstructed mesh frame can be generated based on the point cloud, the estimated connectivity information, the 2D image of the texture map, and the texture coordinates for the mapping information.

In some examples, a connectivity difference is decoded from the bitstream. The estimated connectivity information is combined with the connectivity difference to generate combined connectivity information. The reconstructed mesh frame can be generated based on the point cloud and the combined connectivity information.

In an example, a connectivity difference is decoded from the bitstream. The estimated connectivity information is combined with the connectivity difference to generate combined connectivity information. A video decoder is used to decode, from the bitstream, a two dimensional (2D) image corresponding to a texture map of attributes associated with a surface of the mesh. An attribute decoder is used to decode, from the bitstream, texture coordinates corresponding to mapping information of the mesh. The reconstructed mesh frame is generated based on the point cloud, the 2D image of the texture map, the texture coordinates for the mapping information and the combined connectivity information.

According to some embodiments of the disclosure, the reconstructed mesh frame is a mesh frame in a dynamic mesh that includes a sequence of mesh frames. An interframe connectivity prediction is used of predict current connectivity information of a current mesh frame based on reference connectivity information of a reference mesh frame that has been reconstructed. The current mesh frame is reconstructed based on the current connectivity information that is predicted based on the reference connectivity information of the reference mesh frame.

In some examples, an interframe connectivity difference is decoded from the bitstream. The current connectivity information is determined based on a combination of the interframe connectivity difference and the reference connectivity information of the reference mesh frame.

In some examples, a flag in a syntax associated with a scope of the dynamic mesh is decoded from the bitstream. The flag indicates a use of the interframe connectivity prediction in the scope of the dynamic mesh. The interframe connectivity prediction is used to determine the current connectivity information associated with a mesh portion in the scope of the dynamic mesh based on the reference connectivity information of the reference mesh frame.

In some examples, for a current coding unit in the current mesh frame, a reference coding unit in the reference mesh frame is determined based on at least one of an index or a motion vector. The interframe connectivity prediction is used to determine the current connectivity information of the current coding unit in the current mesh frame based on the reference connectivity information of the reference coding unit in the reference mesh frame. Then, the current coding unit in the current mesh frame can be reconstructed accordingly.

Then, the process proceeds to (S1399) and terminates.

The process (1300) can be suitably adapted. Step(s) in the process (1300) can be modified and/or omitted. Additional step(s) can be added. Any suitable order of implementation can be used.

The techniques disclosed in the present disclosure may be used separately or combined in any order. Further, each of the techniques (e.g., methods, embodiments), encoder, and decoder may be implemented by processing circuitry (e.g., one or more processors or one or more integrated circuits). In some examples, the one or more processors execute a program that is stored in a non-transitory computer-readable medium.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapters (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, the screen (1410) can be connected to the graphics adapter (1450). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for mesh compression, comprising:
   decoding, using a point cloud compression (PCC) decoder and from a bitstream, a point cloud comprising points corresponding to three-dimensional (3D) vertices in a mesh;
   determining estimated connectivity information of the 3D vertices in the mesh based on the points in the point cloud and an algorithm;
   decoding, from the bitstream, a connectivity difference indicating a difference between connectivity information of the 3D vertices in the mesh and the estimated connectivity information of the 3D vertices in the mesh, the connectivity information and the estimated connectivity information indicating connections among the 3D vertices in the mesh;
   combining, the estimated connectivity information with the connectivity difference to generate combined connectivity information that indicates the connectivity information of the 3D vertices in the mesh; and
   generating, a reconstructed mesh based on (i) the point cloud indicating geometry information described by positions of the 3D vertices in the mesh and (ii) the combined connectivity information indicating the connections among the 3D vertices in the mesh.

2. The method of claim 1, wherein
   the method includes decoding, using a video decoder and from the bitstream, a two dimensional (2D) image corresponding to a texture map of attributes associated with a surface of the mesh; and
   the generating includes generating, the reconstructed mesh based on the point cloud, the combined connectivity information, and the 2D image for the texture map.

3. The method of claim 2, wherein
   the method includes decoding, using an attribute decoder and from the bitstream, texture coordinates corresponding to mapping information of the mesh; and the generating includes generating, the reconstructed mesh based on the point cloud, the combined connectivity information, the 2D image of the texture map, and the texture coordinates for the mapping information.

4. The method of claim 1, wherein the points in the point cloud correspond to 3D vertices of a voxelized mesh.

5. The method of claim 1, wherein
a sequence of meshes of a dynamic mesh includes the reconstructed mesh, a reference mesh that has been reconstructed, and a current mesh, and
the method comprises:
predicting, using an interframe connectivity prediction, current connectivity information of the current mesh based on reference connectivity information of the reference mesh that has been reconstructed; and
reconstructing the current mesh based on the current connectivity information that is predicted based on the reference connectivity information of the reference mesh.

6. The method of claim 5, further comprising:
decoding, from the bitstream, an interframe connectivity difference between the current connectivity information of the current mesh and the reference connectivity information of the reference mesh; and
determining the current connectivity information based on a combination of the interframe connectivity difference and the reference connectivity information of the reference mesh.

7. The method of claim 5, further comprising:
decoding a flag in a syntax associated with a scope of the dynamic mesh, the flag being indicative of using the interframe connectivity prediction in the scope of the dynamic mesh; and
predicting, using the interframe connectivity prediction, the current connectivity information associated with a mesh portion in the scope of the dynamic mesh based on the reference connectivity information of the reference mesh.

8. The method of claim 5, further comprising:
determining, for a current coding unit in the current mesh, a reference coding unit in the reference mesh based on at least one of an index or a motion vector; and
determining, using the interframe connectivity prediction, the current connectivity information of the current coding unit in the current mesh based on the reference connectivity information of the reference coding unit in the reference mesh.

9. A method for mesh compression, comprising:
processing a bitstream of a mesh, wherein
the bitstream includes coded information of a point cloud that comprises points corresponding to three-dimensional (3D) vertices in the mesh,
the point cloud is decoded from the bitstream using a point cloud compression (PCC) decoder,
estimated connectivity information of the 3D vertices in the mesh is determined based on the points in the point cloud and an algorithm,
a connectivity difference indicating a difference between connectivity information of the 3D vertices in the mesh and the estimated connectivity information of the 3D vertices in the mesh is decoded, the connectivity information and the estimated connectivity information indicating connections among the 3D vertices in the mesh,
the estimated connectivity information is combined with the connectivity difference to generate combined connectivity information that indicates the connectivity information of the 3D vertices in the mesh, and
a reconstructed mesh is generated based on (i) the point cloud indicating geometry information described by positions of the 3D vertices in the mesh and (ii) the combined connectivity information indicating the connections among the 3D the vertices in the mesh.

10. The method of claim 9, wherein
a sequence of meshes of a dynamic mesh includes the reconstructed mesh, a reference mesh that has been reconstructed, and a current mesh,
current connectivity information of the current mesh is predicted based on reference connectivity information of the reference mesh that has been reconstructed using an interframe connectivity prediction, and
the current mesh is reconstructed based on the current connectivity information that is predicted based on the reference connectivity information of the reference mesh.

11. The method of claim 10, wherein
an interframe connectivity difference between the current connectivity information of the current mesh and the reference connectivity information of the reference mesh is decoded from the bitstream, and
the current connectivity information is determined based on a combination of the interframe connectivity difference and the reference connectivity information of the reference mesh.

\* \* \* \* \*